United States Patent
Kikuchi

[11] Patent Number: 6,042,363
[45] Date of Patent: Mar. 28, 2000

[54] DIE FOR INJECTION MOLDING

[75] Inventor: Masahiko Kikuchi, Miyagi, Japan

[73] Assignee: Sony Corporation, Tokyo, Japan

[21] Appl. No.: 08/758,946

[22] Filed: Dec. 3, 1996

[30] Foreign Application Priority Data

Dec. 8, 1995 [JP] Japan .................................... 7-320682

[51] Int. Cl.[7] ................................................ B29C 45/40
[52] U.S. Cl. .......................... 425/556; 264/334; 425/577
[58] Field of Search ................................... 425/556, 577; 264/334

[56] References Cited

U.S. PATENT DOCUMENTS

5,833,912 11/1998 Schweigert et al. .................... 425/556

Primary Examiner—Tim Heitbrink
Attorney, Agent, or Firm—Jay H. Maioli

[57] ABSTRACT

This invention provides a die for injection molding in which a molded product is supported by a core for a certain time in a cavity block even after an opening operation of the die is started, and the molded product is taken out of the die after the molded product is solidified so that no molded product is deformed at a mold-releasing time and a stable molded product can be obtained with high productivity. A projecting mechanism has a separating delay device for pressing the molded product by the core and supporting the molded product in the cavity block until a movable side die is separated by a predetermined distance from a fixed side die. The separating delay device releases the supporting of the molded product after the movable side die is separated by the predetermined distance from the fixed side die.

5 Claims, 8 Drawing Sheets

DIE FOR INJECTION MOLDING

BACKGROUND OF THE INVENTION

The present invention relates to a die for injection molding used in injection molding and able to manufacture a tape cassette, a disk cartridge, etc. formed by synthetic resin and other molding materials, with high precision and good productivity, and also relates to an injection molding method using this die. More particularly, the present invention relates to a die for injection molding which can promote cooling and solidification of a molded product by holding this molded product in a cavity block as long as possible at a die opening time and can obtain a stable molded product by preventing its deformation at a taking-out time of the molded product, and also relates to an injection molding method using this die.

In general, a box body of a tape cassette, a disk cartridge, etc., is constructed by a pair of shells (also called halves) overlapped with each other and uses thermoplastic resin as its material. Many molded products are simultaneously manufactured by injection molding using a die for injection molding constructed by a fixed side die and a movable side die and able to be opened and closed. Schematic processes of such injection molding are provided as follows.

The die is first clamped (the die clamp is held until the die is opened after a cooling time), and a nozzle next comes in contact with the die by advancing an injecting unit. A molding material is then injected and a die cavity is filled with this molding material. Next, shrinkage of the molding material is restrained by applying a holding pressure to this molding material. Further, a screw is rotated and the next molding material is supplied into a heating cylinder. Next, the nozzle is retreated. When the molding material is cooled and solidified, the die is opened and a molded product is projected out of the die by ejector pins so that one cycle of an injection molding process is completed. The injection molding is continuously performed by repeating this process.

Figure 1:
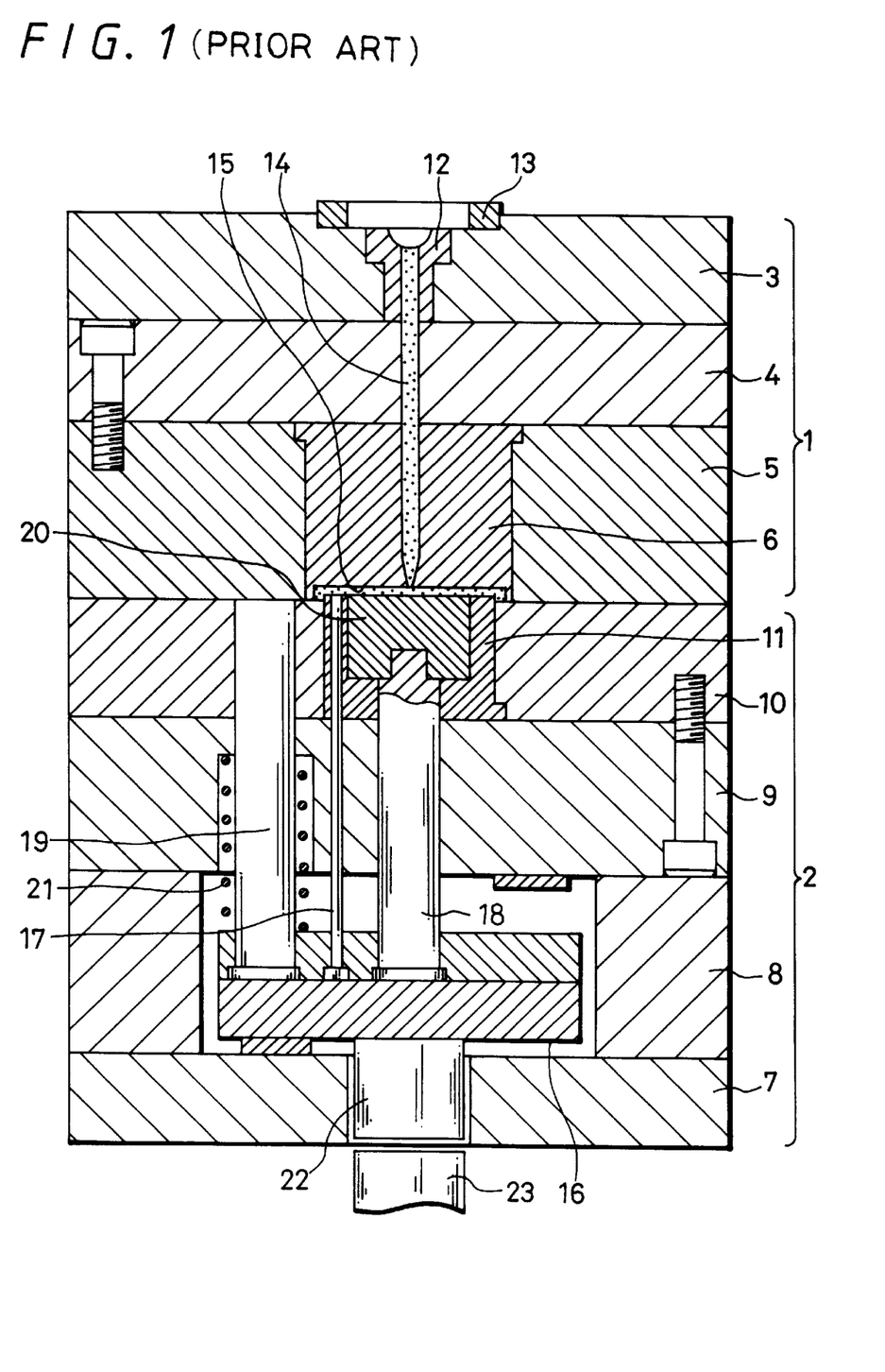
FIG. 1 is a cross-sectional view showing a conventional die for injection molding and a state in which a fixed side die and a movable side die are closed.
Figure 2:
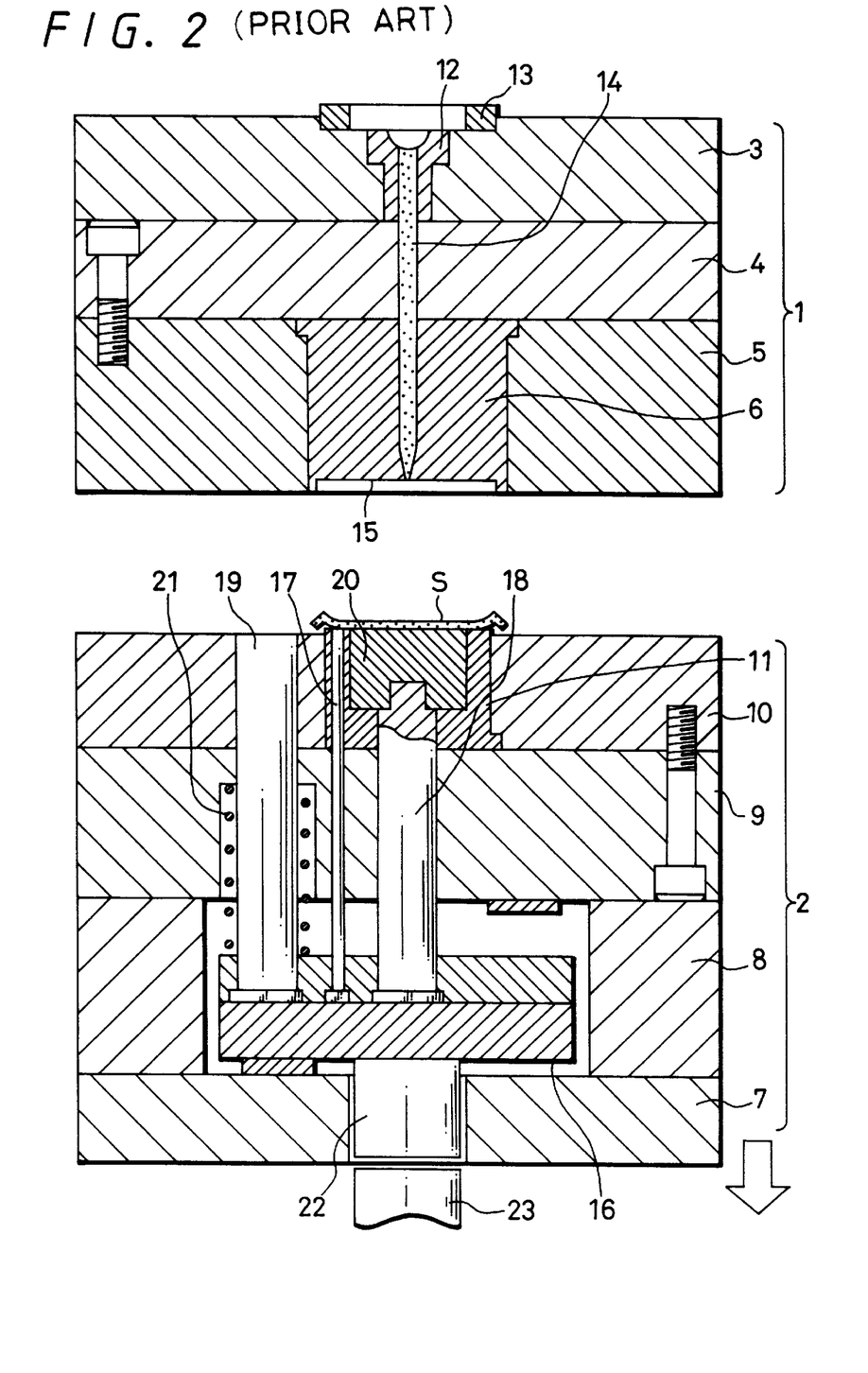
FIG. 2 is a cross-sectional view showing a state in which the movable side die is opened until a predetermined position from the state shown in FIG. 1.
Figure 3:
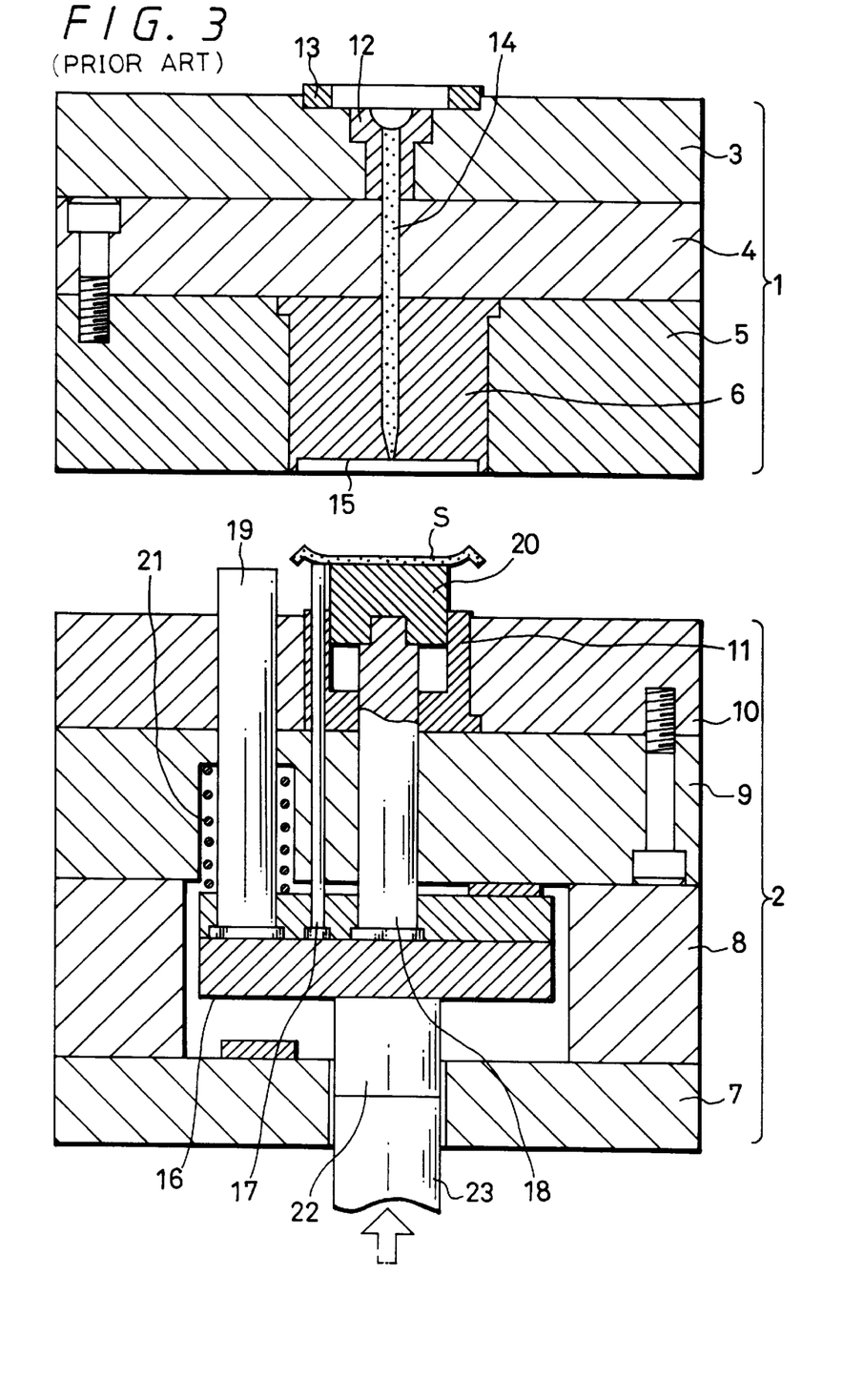
FIG. 3 is a cross-sectional view showing a state in which a molded product is projected by ejector pins by further opening the movable side die from the state shown in FIG. 2.

For example, a conventional die for injection molding used in such injection molding is provided as shown in FIGS. 1 to 3. This die for injection molding is constructed by a fixed side die 1 and a movable side die 2. The fixed side die 1 has a fixed side attaching plate 3, a fixed side receiving plate 4, a fixed side die plate 5 and a cavity block 6. The movable side die 2 has a movable side attaching plate 7, a spacer plate 8, a movable side receiving plate 9, a movable side die plate 10 and a core block 11.

Further, a sprue bush 12 and a locating ring 13 are arranged in the fixed side attaching plate 3 of the fixed side die 1. An injection molding nozzle of an injection molding machine is fitted into the sprue bush 12 and the locating ring 13. A gate of a sprue 14 at its end tip extending from the sprue bush 12 to the cavity block 6 is opened to a cavity 15 of the cavity block 6.

A projecting plate 16 is arranged on a rear face of the movable side receiving plate 9 of the movable side die 2. A plurality of kinds of ejector pins 17, 18 have base portions fixed to this projecting plate 16 and extend through the movable side receiving plate 9 and the core block 11. Similarly, a guide pin 19 has a base portion fixed to the projecting plate 16 and extends through the movable side receiving plate 9 and the movable side die plate 10. An end tip face of the one ejector pin 17 faces the cavity 15. A core 20 is fixed to an end tip of the other ejector pin 18. An end tip face of the core 20 faces the cavity 15. Further, a return spring 21 is externally fitted onto the guide pin 19. The projecting plate 16 is biased by resilient force of the return spring 21 on a side of the movable side attaching plate 7.

Further, an ejector block 22 is fixed to the projecting plate 16. The projecting plate 16 is pushed forward by a projecting rod 23 of the injection molding machine facing this ejector block 22 so that the ejector pins 17, 18 and the guide pin 19 are respectively projected onto a side of the cavity 15.

Thus, as shown in FIG. 1, melted resin injected from the injection molding nozzle of the injection molding machine is injected into the cavity 15 from the sprue gate through the sprue 14 held at a high temperature. After the melted resin is cooled and solidified within the cavity 15, as shown in FIG. 2, a molded product S is separated from a face of the cavity 15 by opening the die. Thereafter, as shown in FIG. 3, the projecting plate 16 is pressed by the projecting rod 23 so that the ejector pins 17 and 18 are projected out. Thus, the molded product S is separated from a face of the core block 11 and is taken out of this face.

However, in the above-mentioned die for injection molding, as shown in FIG. 2, at a die opening time in the taking-out of the molded product, the molded product S is attached to the core block 11 and is moved integrally with this core block 11 simultaneously when the die is opened. Therefore, an external face of the molded product is pulled by adhesive force between the molded product and the cavity 15 so that the molded product S is deformed in many cases. Further, as shown in FIG. 3, when the molded product S is projected, the molded product S is pressed and separated by the ejector pins 17 and 18 against adhesive force between the molded product S and the core block 11. Therefore, the molded product S is similarly deformed by resisting force caused in this separation in many cases. Accordingly, no stable molded product can be obtained in any case.

Specifically, as shown in FIG. 1, the cavity 15 of the die is filled with the melted resin by injecting this melted resin. The melted resin is then solidified by cooling the melted resin in a pressure holding state. However, a considerable time is required until this melted resin is completely solidified. Therefore, when the die is opened after the complete solidification of the melted resin, a considerable time is taken until the die is opened, thereby reducing production efficiency. Therefore, in general injection molding, the die begins to be opened so as to increase productivity of the molded product S of this kind when the melted resin within the cavity 15 is solidified to a certain extent even before this melted resin is completely solidified.

This die opening operation is performed by retreating the movable side die 2. When the movable side die 2 is retreated, the molded product S is retreated integrally with the core block 11 since adhesive force between the molded product S and the core block 11 is generally stronger than that between the molded product S and the face of the cavity 15. Thus, an external face of the molded product S is separated from the cavity face. However, when the external face of the molded product S is separated from the cavity face, separating force is applied to the molded product S by resistance (hereinafter, called "mold-releasing resistance") caused in the die separation based on e.g., an extraction gradient of the cavity 15, a shape of the cavity 15 itself, etc. Therefore, as shown in FIG. 2, a peripheral edge portion of the molded product S is pulled onto a side of the cavity block 6 and is deformed in many cases.

Further, as shown in FIG. 3, when a projecting operation of the molded product S is started before the resin of the molded product S is completely solidified, the molded product S is deformed by mold-releasing resistance caused on the basis of e.g., an extraction gradient of the core 20, a shape of the core 20 itself, etc., and the molded product S is scattered by a sudden separating operation in many cases.

SUMMARY OF THE INVENTION

In view of the aforesaid aspect, it is an object of the present invention to provide a die for injection molding and an injection molding method using this die in which a molded product is supported by a core for a certain time in a cavity block even after an opening operation of the die is started, and the molded product is taken out of the die after the molded product is solidified so that no molded product is deformed at a mold-releasing time and a stable molded product can be obtained with high productivity.

According to the present invention, there is provided a die for injection molding of the present invention comprising a projecting mechanism having a separating delay means for pressing a molded product by a core and supporting the molded product in a cavity block until a movable side die is separated by a predetermined distance from a fixed side die. The separating delay means releases the supporting of the molded product after the movable side die is separated by the predetermined distance from the fixed side die.

According to the present invention, there is provided an injection molding method in which a molded product is supported in a cavity block by a core on the side of a movable side die at a die opening time until the movable side die is separated by a predetermined distance from a fixed side die, and the molded product is separated from the cavity block by releasing the supporting of the molded product by the core after the movable side die is separated by the predetermined distance from the fixed side die.

According to the present invention, the molded product is supported in the cavity block by the core until the movable side die is separated by the predetermined distance from the fixed side die. The supporting of the molded product by the core is released after the movable side die is separated by the predetermined distance from the fixed side die. Therefore, solidification of a melted material can be promoted by lengthening a supporting time of the molded product, and productivity can be improved by preventing deformation of the molded product.

DETAILED DESCRIPTION OF THE PREFERRED EMBODIMENT

The present invention will now be described with reference to the drawings.

FIGS. 4 to 8 show one embodiment of the present invention.

Figure 4:
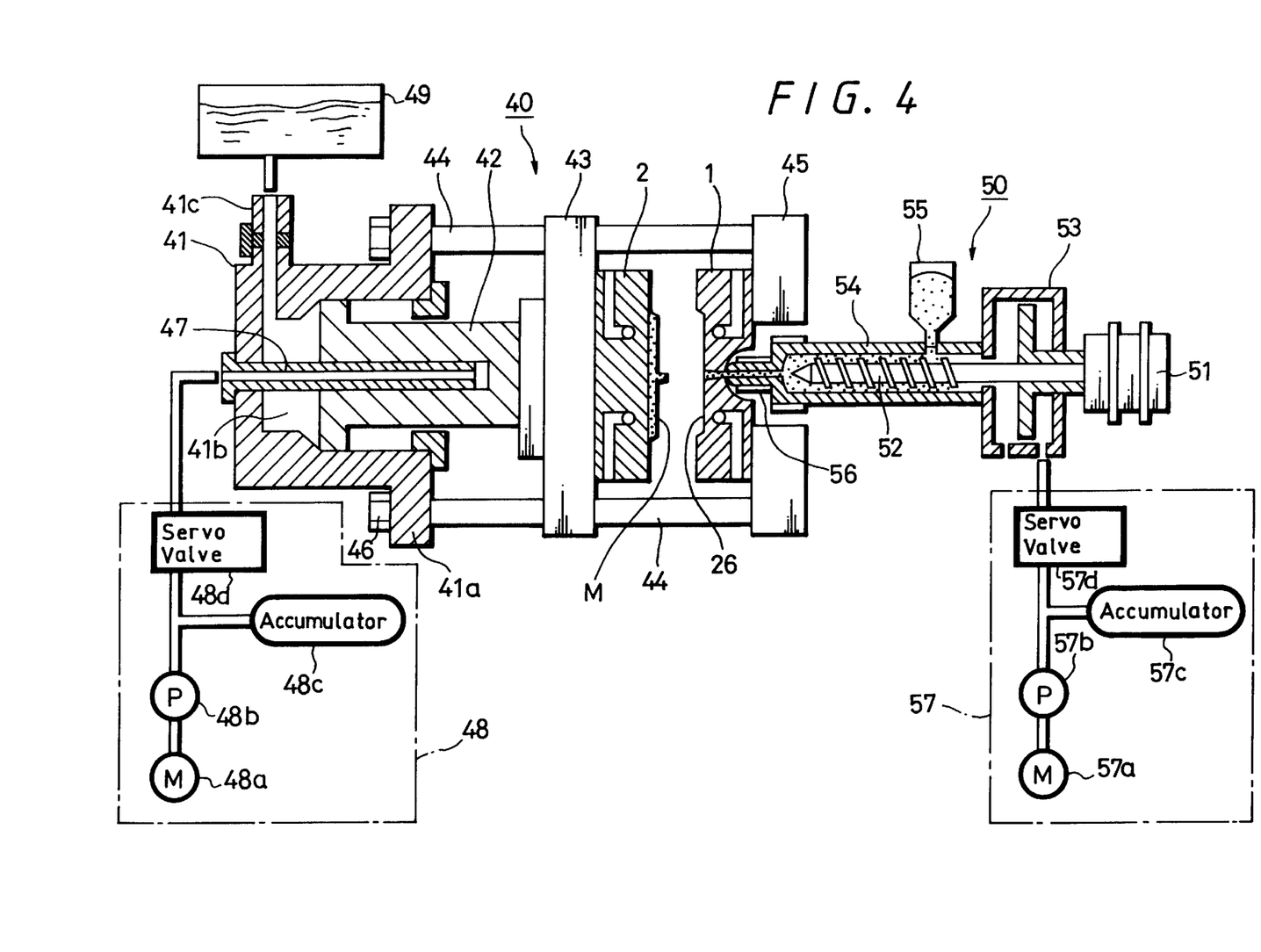
FIG. 4 is an explanatory view showing an injection molding machine using a die for injection molding according to the present invention.
Figure 5:
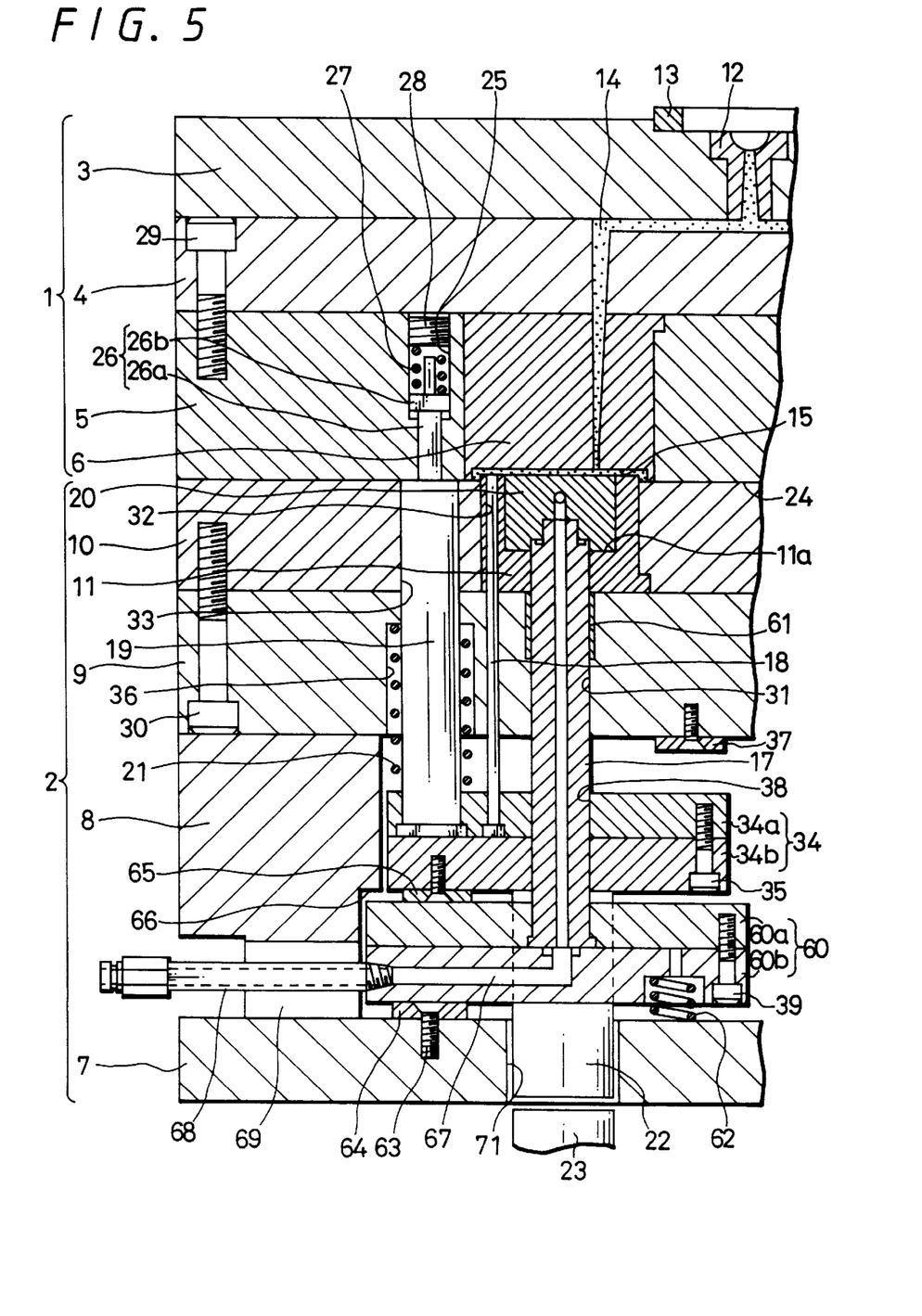
FIG. 5 is a cross-sectional view showing an embodiment of the die for injection molding according to the present invention and the manner in which a fixed side die and a movable side die are closed.
Figure 6:
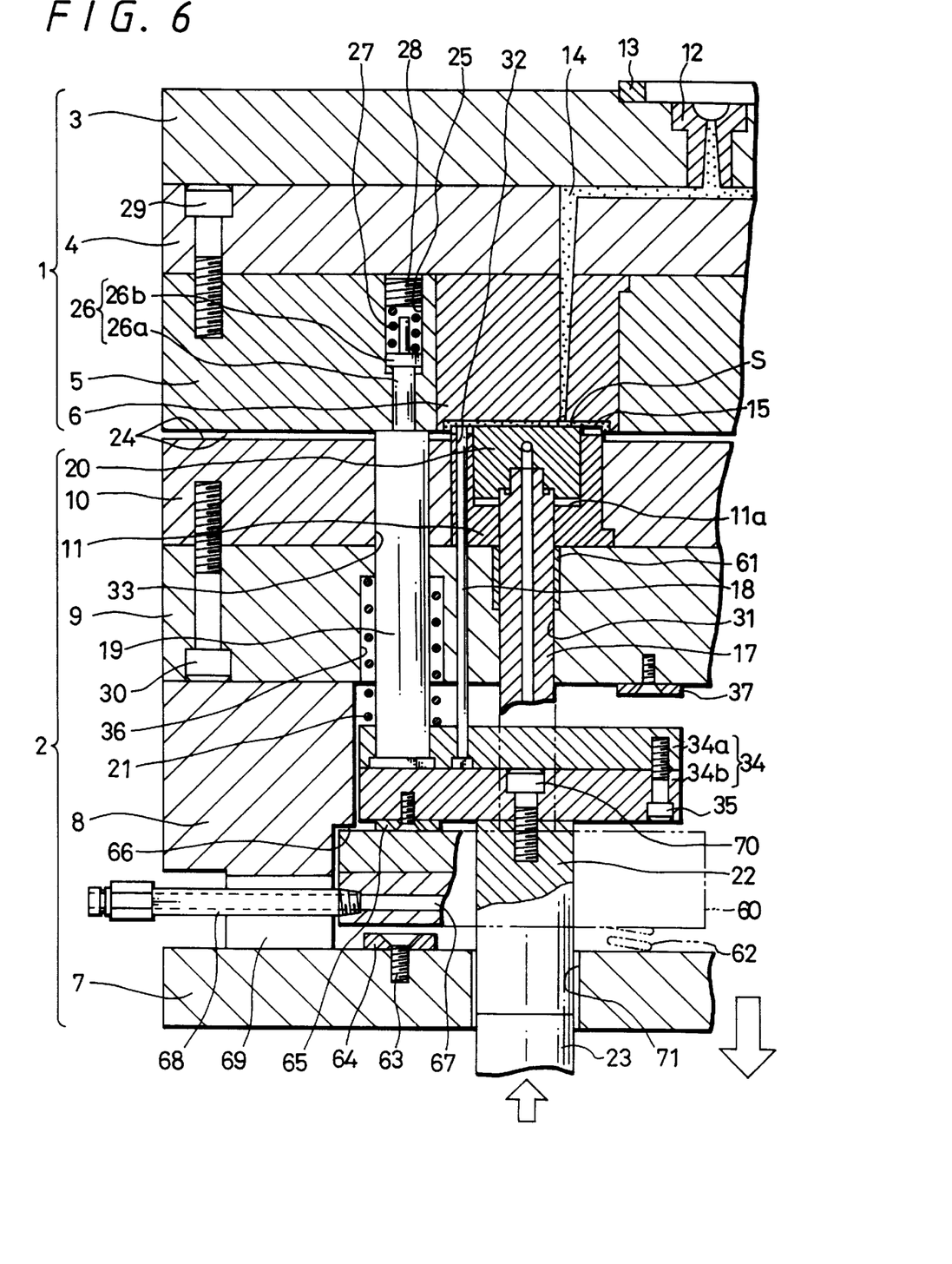
FIG.6 is a cross-sectional view showing a state in which the movable side die is slightly opened from the state shown in FIG. 5.
Figure 7:
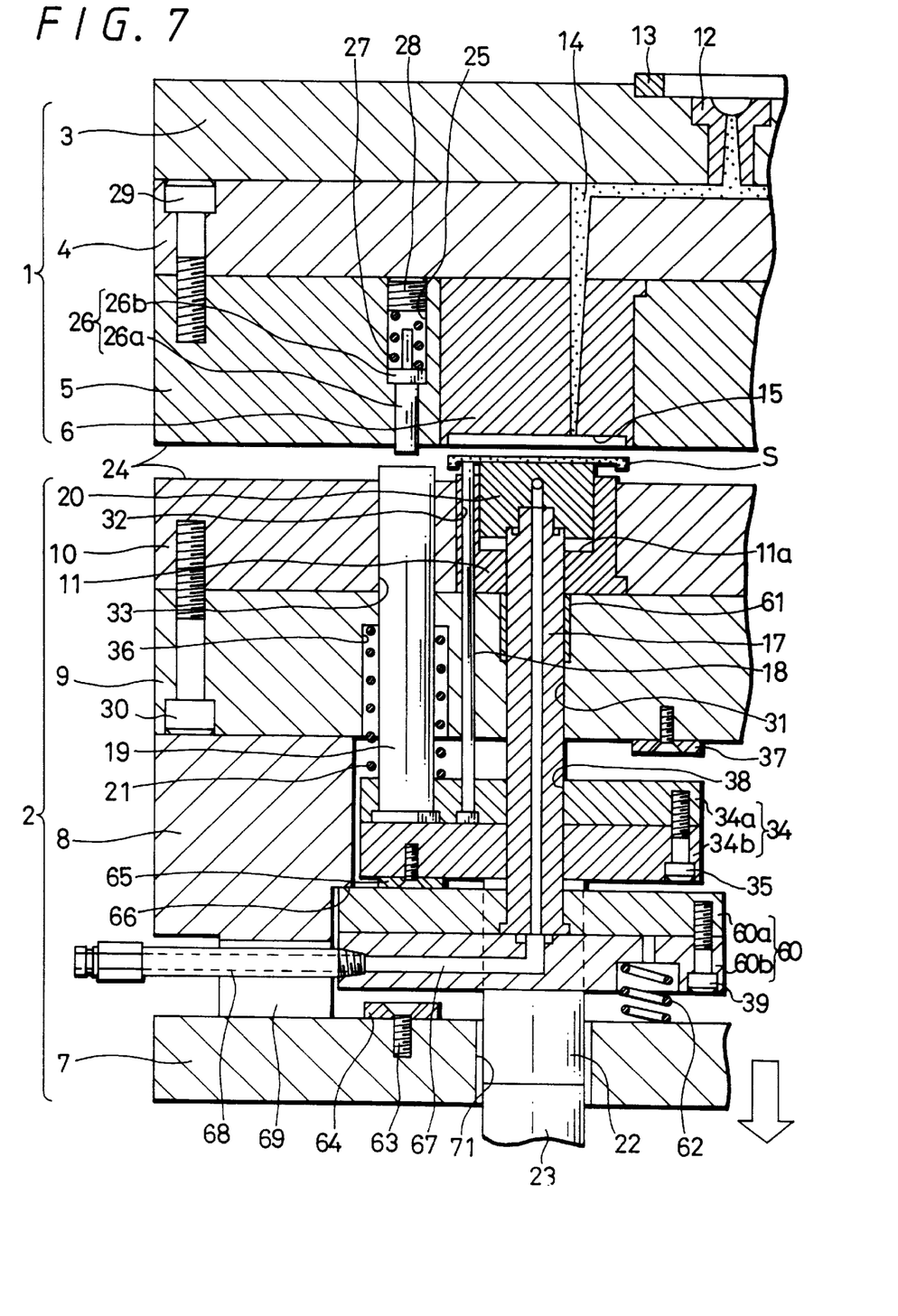
FIG. 7 is a cross-sectional view showing a state in which the movable side die is opened up to a predetermined position from the state of FIG. 6.
Figure 8:
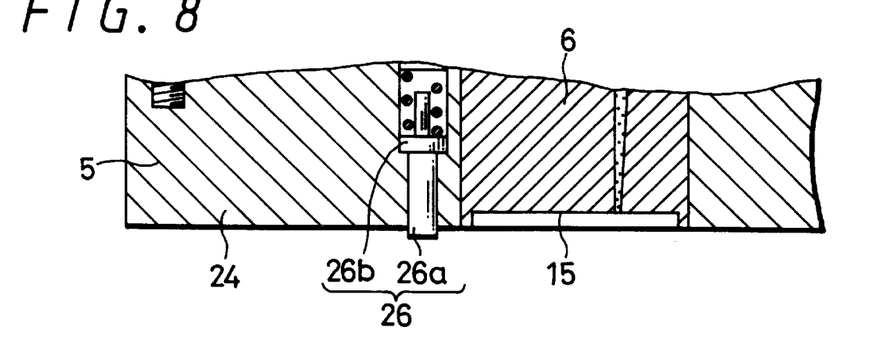
FIG. 8 is a cross-sectional view showing a state in which a molded product is projected by ejector pins by further opening the movable side die from the state of FIG. 7.

FIG. 4 is an explanatory view showing an injection molding machine using a die for injection molding according to the present invention. FIG. 5 is an explanatory view showing the die for injection molding according to one embodiment of the present invention in cross section. FIG. 6 is an explanatory view showing the state until a movable side die is separated by a predetermined distance from a fixed side die from the state shown in FIG. 5. FIG. 7 is an explanatory view showing the state when the movable side die is separated by a predetermined distance from the fixed side die from the state of FIG. 3. FIG. 8 is an explanatory view showing the state in which ejector pins are projected after the movable side die is separated by a predetermined distance from the fixed side die from the state shown in FIG. 7. In FIGS. 4 through 8, elements and parts identical to those of FIGS. 1 to 3 which show the die for injection molding are marked with the the same reference numerals and need not be described in detail in the following explanation.

The injection molding machine shown in FIG. 4 is constructed by a die clamping device 40 having a die clamping mechanism of a direct pressing system by a die clamping cylinder, and an injecting device 50 having an injecting unit of a screw inline system. Similar to the aforementioned die, the die for injection molding in this embodiment is used by mounting this die to the die clamping device 40 and is opened and closed by moving a movable board 43 back and forth. The injection molding is executed at a die clamping time by injecting melted resin into a cavity 15 of the die for injection molding from the injecting device 50.

The die clamping device 40 has a die clamping cylinder 41, a die clamping ram 42 slidably held by this die clamping cylinder 41, the movable board 43 fixed to one end of this die clamping ram 42, plural tie bars 44 and a fixed board 45 for fixing one end of each of these tie bars 44 thereto. The plural tie bars 44 slidably extend through the movable board 43 and are arranged in parallel with each other. The other end of each of the tie bars 44 extends through a flange portion 41a of the die clamping cylinder 41 and is fixedly fastened by a tie bar nut 46 to the flange portion 41a. The movable side die 2 of the die for injection molding is attached to the movable board 43. The fixed side die 1 is attached to the fixed board 45 such that the fixed side die 1 is opposed to this movable side die 2. Thus, the movable side die 2 is constructed such that the movable side die 2 can be advanced and retreated with respect to the fixed side die 1.

Further, a booster ram 47 is inserted into the die clamping cylinder 41. A tip portion of this booster ram 47 is slidably inserted into the die clamping ram 42. A hydraulic device 48 is connected to a base portion of this booster ram 47. This hydraulic device 48 has a motor 48a, a hydraulic pump 48b, an accumulator 48c and a servo valve 48d. The pressure of oil discharged from the hydraulic pump 48b driven by the motor 48a or the pressure of oil accumulated in the accumulator 48c is introduced into the die clamping ram 42 from the servo valve 48d through the booster ram 47. An oil tank 49 is connected to a cylinder chamber 41b of the die clamping cylinder 41 through an oil path 41c.

The injecting device 50 has an hydraulic motor 51, a screw 52, an injecting cylinder 53, a heating cylinder 54, a hopper 55, etc. An injection molding nozzle 56 is arranged in an end tip portion of the heating cylinder 54 and faces the fixed side die 1 of the die for injection molding. The screw 52 of the injecting device 50 is coupled to a rotating shaft of the hydraulic motor 51 and can be rotated integrally with this rotating shaft. Synthetic resin of a molding material supplied from the hopper 55 is melted by rotating the screw 52 within the heated heating cylinder 54. The synthetic resin is also moved in an axial direction by driving the injecting cylinder 53 so that the screw 52 also acts as a plunger. Thus, the melted synthetic resin is pushed into the cavity 15 of the die for injection molding.

To this end, a hydraulic device 57 is connected to the injecting cylinder 53. This hydraulic device 57 has a motor 57a, a hydraulic pump 57b, an accumulator 57c and a servo valve 57d. The pressure of oil discharged from the hydraulic pump 57b driven by the motor 57a or the pressure of oil accumulated in the accumulator 57c is introduced into the injecting cylinder 53 from the servo valve 57d. The hydraulic device 57 may be separately constructed independently of the hydraulic device 48 of the die clamping device 40 as in this embodiment. Alternatively, the one hydraulic device 57 (or 48) can be also used as the other hydraulic device 48 (or 57).

The die for injection molding in this embodiment applied to the injection molding machine having the above construction will next be explained. As shown in FIGS. 5 to 8, this die for injection molding is applied to a so-called taking-out die of a plurality of products capable of molding plural molded products once.

A molded product as an object of the injection molding according to the present embodiment may be constructed by various kinds of box bodies such as a compact cassette, a tape cassette or a disk cartridge, etc. composed of a pair of upper and lower shells vertically overlapped. However, this molded product is not limited to these box bodies, but may be applied to a case in which a box body can be independently constructed, and can be also applied to molding of various kinds of articles except for the box bodies. Further, in general, a cassette shell such as a compact cassette, etc. is produced in large quantities by the injection molding with thermoplastic resin such as styrene resin (e.g., ABS resin, high impact polystyrene, etc.) as a molding material. Accordingly, these resins can be used as the molding material. Further, other thermoplastic resins capable of performing the injection molding, a metal, an alloy, etc. capable of performing the injection molding except for synthetic resin can be suitably used as the molding material.

In FIG. 5, the die for injection molding in this embodiment is constructed by the fixed side die 1 attached to the fixed board 45 of the injection molding machine and the movable side die 2 attached to the movable board 43. The fixed side die 1 has a fixed side attaching plate 3, a fixed side receiving plate 4, a fixed side die plate 5 and a cavity block 6. The fixed side receiving plate 4 is arranged on a front face of the fixed side attaching plate 3. The fixed side die plate 5 is arranged on a front face of this fixed side receiving plate 4. These plates 3, 4 and 5 are overlapped with each other.

openings are formed through in the fixed side die plate 5 and the number of these openings is set to a simultaneously injection molding number. The cavity block 6 is detachably fitted into each of the openings from a rear face side. Further, an inserting through-hole 25 having a two-stage structure is formed through the fixed side die plate 5 and a diameter of the inserting through-hole 25 on the rear face side is set to be greater than that on the side of a parting face 24. A balance pin 26 is slidably inserted into this inserting through-hole 25 in the axial direction.

The balance pin 26 has a pin body 26a inserted into a small diameter portion of the inserting through-hole 25 and also has a flange 26b fitted into a large diameter portion of the inserting hole 25. One end of a coil spring 27 shown as one concrete example of a resilient body is seated on a rear face side of the flange 26b and the pin body 26a is biased by this coil spring 27 to the front face side so that an end tip of the pin body 26a is projected onto the front face from the parting face 24 in a free state. The other end of the coil spring 27 comes in contact with an end face of an adjusting screw 28 screwed into the large diameter portion of the inserting through-hole 25. Biasing force of the balance pin 26 can be changed in strength by advancing and retreating this adjusting screw 28 to change resilient force of the coil spring 27.

A sprue bush 12 and a locating ring 13 are concentrically attached to the fixed side attaching plate 3. The injection molding nozzle 56 of the injection molding machine (see FIG. 4) is arranged on the rear surface side of the sprue bush 12. An injecting port of this injection molding nozzle 56 faces the sprue bush 12. The sprue bush 12 is communicated with a cavity 15 opened to the parting face 24 of the cavity block 6 by a sprue 14 extending through the fixed side receiving plate 4 and the cavity block 6. A melted material passing through this sprue 14 is injected into the cavity 15 from a gate of the sprue 14 at its end tip.

Thus, extraction of the cavity block 6, etc. fitted into the fixed side die plate 5 is prevented by the fixed side receiving plate 4 arranged on the rear face side of the fixed side die plate 5. The fixed side die plate 5 is fastened and fixed to the fixed side receiving plate 4 by an attaching screw 29 screwed from the rear face side. The fixed side receiving plate 4 and the fixed side attaching plate 3 are constructed such that these plates are easily attached and detached by a fastening means (not shown). The fixed side attaching plate 3 is moved backward by unfastening this fastening means so that a predetermined clearance is produced between the fixed side attaching plate 3 and the fixed side receiving plate 4. Thus, a runner filling the sprue 14 can be removed from this clearance.

The movable side die 2 has a movable side attaching plate 7, a spacer plate 8, a movable side receiving plate 9, a movable side die plate 10 and a core block 11. A core 20 is fitted into a recessed portion formed on a front face of the core block 11 such that the core 20 can be projected. The movable side receiving plate 9 is arranged on a front face of the movable side attaching plate 7 through the spacer plate 8 and these plates are fastened and fixed to each other by unillustrated attaching screws through not shown. Further, the movable side die plate 10 is arranged on a front face of the movable side receiving plate 9. Openings are formed through this movable side die plate 10 and are opposed to the openings of the fixed side die plate 5. The number of these openings of the movable side die plate 10 is set to be equal to that of the fixed side die plate 5.

The core block 11 is detachably fitted into each of the openings of the movable side die plate 10 from its rear face side. Extraction of the core block 11 is prevented by the movable side receiving plate 9 arranged on its rear face side. The movable side die plate 10 is fastened and fixed to the movable side receiving plate 9 by an attaching screw 30 screwed from the rear face side. End tip portions of the core block 11 and the core 20 stored into the recessed portion of this core block 11 are projected from the parting face 24 into the cavity 15. Thus, a cavity space forming a molded product S is constructed by the cavity 15 comprising a concave portion of a predetermined shape forming an external face of the molded product S, and the core block 11 and the core 20 comprising a convex portion of a predetermined shape forming an internal face of the molded product S.

A plurality of through-holes 31, 32 are formed through such a movable side receiving plate 9 and the core block 11. A through-hole 33 is also formed through each of the movable side receiving plate 9 and the movable side die plate 10. A first ejector pin 17 is slidably inserted into the through-hole 31. A second ejector pin 18 is slidably inserted into the through-hole 32. A guide pin 19 is slidably inserted into the through-hole 33. A fixed portion having a large outside diameter is formed at one end of each of the second ejector pin 18 and the guide pin 19 projecting on the rear face side of the movable side receiving plate 9. Each fixed portion is supported by a first plate 34a and a second plate 34b. Thus, a plurality of the second ejector pins 18 and the guide pins 19 are fixed to a second projecting plate 34 composed of the first plate 34a and the second plate 34b. The first plate 34a and the second plate 34b are detachably fastened and fixed to each other by a plurality of attaching screws 35 screwed from the rear face side.

The other end of the second ejector pin 18 extends through the through-hole 32 and faces the cavity 15 from a front face of the core block 11. The second ejector pin 18 is advanced at a die opening time and its end tip is projected from a core surface so that the molded product S injected and solidified into the cavity space can be projected and separated from the core block 11. To this end, the second ejector pin 18 is approximately equally arranged in each of a plurality of positions in consideration of a size and a shape of the molded product, a large or small value of separating resistance based on the size and the shape of the molded product, etc.

Further, the other end of the guide pin 19 extends through the through-hole 33 and faces the parting face 24. The balance pin 26 of the fixed side die 1 comes in contact with a center of the guide pin 19 on its end tip face at a die closing time. A return spring 21 is illustrated as one concrete example of a resilient body for biasing the second projecting plate 34 in a direction separated from the movable side receiving plate 9 and is mounted on this guide pin 19. One end of the return spring 21 is inserted into a spring seat 36 formed in the movable side receiving plate 9. Compression and variation of the return spring 21 are allowed by this spring seat 36. Further, a movement of the second projecting plate 34 onto its front face side is restricted by a second stopper 37 fixed onto a rear face of the movable side receiving plate 9.

The first ejector pin 17 slidably extends through a through-hole 38 formed through the second projecting plate 34. A fixed portion having a large outer diameter is formed at one end of the first ejector pin 17 projecting on the rear surface side of this second projecting plate 34. The first ejector pin 17 is fixed to a first projecting plate 60 comprising a first plate 60a and a second plate 60b by supporting this fixed portion by the first plate 60a and the second plate 60b. The first plate 60a and the second plate 60b are detachably fastened and fixed to each other by a plurality of attaching screws 39 screwed from the rear surface side.

The other end of this first ejector pin 17 extends through the through-hole 31 and is projected into the recessed portion of the core block 11. This projected portion is coupled to a fitting hole opened onto a rear face side of the core 20 by press fitting, etc. so that the core 20 is integrally fixed to the first ejector pin 17. A sleeve 61 fitted into the movable side receiving plate 9 is slidably fitted onto this first ejector pin 17. Sliding characteristics of the first ejector pin 17 are preferably held by this sleeve 61.

Further, a coil spring 62 shown as one concrete example of a resilient body is interposed in a compressing state between the first projecting plate 60 and the movable side attaching plate 7. The first projecting plate 60 is biased by resilient force of this coil spring 62 in the direction approaching the second projecting plate 34. A movement of the first projecting plate 60 onto its rear surface side is limited by a return stopper 64 fixed to the front surface of the movable side attaching plate 7 by an attaching screw 63. A movement of the first projecting plate 60 onto its front face side is limited by a first stopper 65 fixed to the rear surface of the second projecting plate 34 and is also limited by a step portion stopper 66 arranged in the spacer plate 8.

A cooling path 67 flowing cooling water as one concrete example of a cooling medium therethrough is formed in the first ejector pin 17 and the second plate 60b of this first projecting plate 60. This cooling path 67 extends through an axial portion of the first ejector pin 17 and reaches the core 20 so that the inside of the core 20 can be forced to be cooled by the cooling water. A piping pipe 68 is joined to an opening portion of the cooling path 67 formed in the first projecting plate 60. A notch 69 is formed in the spacer plate 8 to externally project the other end of this piping pipe 68. A piping member, not shown, is connected to a projecting end of this piping pipe 68. The projecting end of the piping pipe 68 is connected to a cooling device through this piping member.

Cooling paths for flowing cooling water as a cooling medium are also formed in the cavity block 6 and the core block 11 although these cooling paths are not shown. These cooling paths are connected to an external cooling device from passages formed in the fixed side receiving plate 4 and the movable side receiving plate 9. Accordingly, the cavity block 6 and the core block 11 are respectively forced to be cooled by the cooling water supplied from the cooling device.

Furthermore, as shown in FIG. 6, an ejector block 22 is fixed onto the rear surface side of the second projecting plate 34 by an attachment screw 70. This ejector block 22 is inserted into a through-hole 71 formed through the movable side attaching plate 7. An end tip of a projecting rod 23 arranged in an injection molding machine faces an end tip of this ejector block 22 such that the projecting rod 23 can be moved back and forth. Accordingly, when the projecting rod 23 is advanced, a plurality of ejector pins 17 are advanced through the second projecting plate 34 so that a projecting operation of the molded product S is executed. The first projecting plate 60 can be moved back and forth between the return stopper 64 and the first stopper 65 or the step portion stopper 66. Accordingly, a movable range of the first projecting plate 60 is changed in accordance with a position of the second projecting plate 34.

The die for injection molding has a separating delay means for supporting the molded product S by the core 20 in the cavity block 6 until the movable side die 2 is separated by a predetermined distance from the fixed side die 1 by the above-mentioned first ejector pins 17, the core 20, the first projecting plate 60 and the coil spring 62. The separating delay means releases the supporting of the molded product S by the core 20 after the movable side die 2 is separated by the predetermined distance from the fixed side die 1. Further, the die for injection molding has a pressure adjusting means for providing resilient force acting against resilient force of the coil spring 62 of the separating delay means by the balance pin 26, the coil spring 27 and the adjusting screw 28 so that pressing force of the core 20 can be adjusted.

A projecting mechanism for projecting the molded product S and taking the molded product S out of the die is constructed by the above separating delay means, the pressure adjusting means, the second ejector pin 18, the guide pin 19, the return spring 21, the ejector block 22, the projecting rod 23, the second projecting plate 34 and the first stopper 65.

For example, the die for injection molding having such an arrangement is attached to the injecting molding machine and is used to mold the molded product S having a predetermined shape as follows. In this case, the fixed die 1 forming one of dies for injection molding is fixed to the fixed board 45 of the injection molding machine and the movable side die 2 forming the other of the dies for injection molding is fixed to the movable board 43 of the injection molding machine.

Initially, the die clamping device 40 of the injection molding machine is operated and the movable side die 2 is pressed against the fixed side die 1 so that the fixed and movable side dies for injection molding are aligned with each other and are clamped.

Then, a synthetic resin as a molding material is heated and melted by operating the injecting device 50 and is injected into the sprue bush 12 from the injection molding nozzle 56. The melted resin at a high temperature is then injected into the cavity 15 from the gate of the sprue 14 so that the cavity space is filled with the melted resin as shown in FIG. 5.

Thus, after the cavity 15 is filled with the melted resin, a proper holding pressure is applied to the melted resin and the melted resin is cooled during a predetermined period of time. The resin within the cavity 15 is solidified so that a molded product S having a predetermined shape is injected and molded. When the melted resin within the cavity 15 is solidified, the fixed and movable side dies are opened and the molded product S is removed.

In this case, the movable board 43 of the injection molding machine is moved backward by a slight distance in its initial operation. Moreover, the fixed side die 1 and the movable side die 2 are separated from the parting face 24 so that these dies are opened as shown in FIG. 6. At this time, a force in the acting direction composed of resilient force of the coil spring 62 for biasing the first projecting plate 60 on the side of the movable side receiving plate 9 is set to be stronger than a force in the reacting direction which is provided by adding a resilient force of the coil spring 27 for biasing the second projecting plate 34 so as to separate this second projecting plate 34 from the movable side receiving plate 9 through the guide pin 19, to a resilient force of the return spring 21 for biasing the second projecting plate 34 so as to separate this second projecting plate 34 from the movable side receiving plate 9.

Accordingly, a force in the acting direction obtained by subtracting the force in the reacting direction from the above force in the acting direction is applied from the first projecting plate 60 to the second projecting plate 34 through the first stopper 65. Therefore, both of the projecting plates 60 and 34 are held in their initial positions. Further, the movable side attaching plate 7, the spacer plate 8, the movable side receiving plate 9, the movable side die plate 10 and the core block 11 are integrally moved backward by a slight distance. Therefore, the front face of the core 20 fixed to the end tip of the first ejector pin 17 fixed to the first projecting plate 60, and the end tip face of the second ejector pin 18 fixed to the second projecting plate 34 are supported on the inner surface of the molded product S in a contact state. Further, the guide pin 19 is supported against the resilient force of the coil spring 27 in a pushing-in state of the balance pin 26.

As a result, a front face of the core block 11 is separated from the inner surface of the molded product S. The front surfaces of the core 20 and the second ejector pin 18 support the contact state on the inner surface of the molded product S. The molded product S is urged against the cavity 15 by a pressing force of the core 20, etc. Therefore, no separating force simultaneously caused by the die opening is applied to the molded product S unlike the aforementioned case. Accordingly, since no excessive separating force is applied to the molded product S, it is possible to effectively prevent first stage deformation of the molded product S at a first stage of a product separating process. Further, in the aforementioned case, it is necessary to start the die opening after the molded product S has been completely solidified. However, according to the present invention, the solidification of the molded product S is advanced while the core 20 and the second ejector pin 18 press the molded product S. Accordingly, a starting time of the die opening can be correspondingly advanced so that productivity in the injection molding of this kind increases and a production efficiency can be improved.

The magnitude of the force in the acting direction provided by the coil spring 62 can be easily adjusted by changing the resilient force of the coil spring 27 with the adjusting screw 28. Therefore, the strength of pressing force of each of the core 20 and the second ejector pin 18 can be set in accordance with thickness and strength of the molded product S, etc. Accordingly, the first stage deformation of the molded product S can be avoided with a force suitable for the molded product S.

As shown in FIG. 7, the movable board 43 of the injection molding machine is next retreated further so that the movable side die 2 is retreated up to a predetermined position. Thus, in the initial stage, the first projecting plate 60 maintains its previous state under resilient force of the coil spring 62. However, the step portion stopper 66 of the spacer plate 8 comes in contact with the front surface of the first projecting plate 60 by retreating the movable side receiving plate 9. Therefore, the first projecting plate 60 will hereinafter be moved backward in unison with the spacer plate 8, etc. Accordingly, the first ejector pin 17 and the core 20 integrated with the first projecting plate 60 are similarly retreated. When the first projecting plate 60 is moved backward as described above, the second projecting plate 34 is moved under resilient force of the return spring 21 in the direction separated from the movable side receiving plate 9. Accordingly, the second ejector pin 18 integrated with the second projecting plate 34 is similarly retreated.

As a consequence, the molded product S is moved backward in unison with the core 20, etc. by an adhesive force between the inner surface of the molded product S and the front surfaces of the core 20 and the second ejector pin 18. Accordingly, the outer surface of the molded product S is separated from the surface of the cavity 15. A projecting amount of the balance pin 26 is limited to a constant amount in accordance with a shape of the inserting hole 25 for storing the balance pin 26 thereinto. Therefore, when the movable side die 2 is moved backward by a constant distance, a clearance can be produced between the balance pin 26 and the guide pin 19. In this case, a sufficient time required to completely solidify the molded product S has passed until the core 20, etc. begin to be retreated. Accordingly, the solidification of the molded product S is completed. Therefore, the molded product S is never deformed by a mold-releasing force caused when the molded product S is separated from the surface of the cavity 15.

After the movable side die 2 is moved backward next until a predetermined position, as shown in FIG. 8, the movable board 43 of the injection molding machine is further retreated so that the movable side die 2 is retreated until a predetermined position. Thereafter, the projecting rod 23 arranged in the injection molding machine is advanced. As a result, the projecting rod 23 contacts the ejector block 22 and pushes this ejector block 22. This ejector block 22 advances the fixed second projecting plate 34 against the biasing force of the return spring 21. Thus, the second ejector pin 18 fixed to the second projecting plate 34 is advanced and the molded product S attached to the front surface of the core 20 is separated therefrom and is projected by a second stage projecting operation of this second ejector pin 18.

In this case, a large portion of an attachment surface of the movable side die 2, i.e. all attachment surfaces of the molded product S and the core block 11 are separated from each other by the above-mentioned first stage projecting operation without deforming the molded product S. The remaining attachment suffaces are only attachment surfaces of the core 20 and the second ejector pin 18. Therefore, these attachment surfaces can be extremely simply separated from each other without deforming the molded product S in this second stage separating operation. Accordingly, the second stage deformation of the molded product S at the second stage of the product separating process can be avoided effectively. Furthermore, no excessive mold-releasing force is applied to the molded product S so that the molded product S in the second stage projecting operation can be prevented from being scattered.

Thereafter, when the projecting rod 23 is retreated, the pressing force of the ejector block 22 is released. Therefore, the second projecting plate 34 is retreated under spring-biasing force of the return spring 21. The second ejector pin 18 and the guide pin 19 are returned onto the rear surface side. When the first stopper 65 then comes in contact with the first projecting plate 60, the retreating movement of the second projecting plate 34 is stopped. Thus, it is possible to perform a die closing operation together with the fixed side die 1 to advance the next injection molding. As a result, the injection molding machine is operated as described above and the movable side die 2 is aligned with the fixed side die 1 and these dies are clamped so that the next injection molding is completely prepared.

The present invention is not limited to the above-mentioned embodiment. For example, the injection molding machine can be constructed by an injection molding machine of each of a plunger type and a screw prepra type except for the screw inline type. Shapes, sizes, etc. of the cavity block and the core block are not limited to those shown. Further, a hydraulic device is used as a die driving means of the injection molding machine in the above-mentioned embodiment, but a pneumatic device and other drive units also may be used.

In the above-mentioned embodiment, a coil-shaped spring is used as one concrete example of a resilient body in each of the return spring 21, the coil spring 27 and the coil spring 62. However, a spring member such as a leaf spring, etc. may be used in each of these springs. Further, a rubber-shaped elastic body such as a synthetic rubber, a synthetic resin, etc. may be also used in each of these springs.

Further, a tape cassette such as a compact cassette, a video cassette, etc. is used as a molded product. However, the present invention is not limited to a die for the tape cassette. For example, the die for injection molding in the present invention can be used as dies for injection molding for manufacturing various kinds of box bodies such as the cartridge of a compact disk, the cartridge of a floppy disk, etc., and various kinds of molded products except for the box bodies. Thus, the present invention can be variously changed within a scope not departing from its features.

As explained above, in accordance with the present invention, a projecting mechanism has a separating delay means for pressing the molded product by the core and supporting the molded product in the cavity block until the movable side die is separated by a predetermined distance from the fixed side die. The separating delay means releases the supporting of the molded product after the movable side die is separated by the predetermined distance from the fixed side die. Therefore, the molded product is supported by the core within a certain time in the cavity block even after an opening operation of the die is started. Thus, the molded product can be taken out of the die after the molded product is completely solidified. Accordingly, it is possible to provide a die for injection molding and an injection molding method using this die in which deformation of the molded product can be prevented at a mold-releasing time and a stable molded product can be obtained with high productivity.

Further, since no excessive mold-releasing force is applied to the molded product, no mold-releasing deformation of the molded product is caused at a final projecting time of the molded product and the molded product can be extremely easily separated from the core. Furthermore, scattering of the molded product can be prevented in a final projecting operation. Accordingly, the molded product can be smoothly transmitted and received in the next process so that no defect in the molded product is caused in the next process work.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims,

What is claimed is:

1. A die for injection molding comprising:
   a fixed side die having a cavity block for forming an external face of a molded product;
   a movable side die which has a core block for forming an internal face of said molded product and has a core supported to be projected from said core block, said movable side die being arranged such that the movable side die can be joined to said fixed side die and can be separated from said fixed side die; and
   a projecting mechanism for projecting and separating said molded product attached to said core block and said core therefrom by a primary ejector pin at a mold opening time of said fixed side die and said movable side die;
   wherein said projecting mechanism has separating delay means for pressing said molded product by said core and supporting said molded product in said cavity block until said movable side die is separated by a predetermined distance from said fixed side die, and the separating delay means releases the supporting of the molded product by said primary ejector pin after the movable side die is separated by said predetermined distance from the fixed side die.

2. A die for injection molding as claimed in claim 1, wherein said projecting mechanism has a first projecting plate having a secondary ejector pin fixing said core thereto and also has a second projecting plate having a said primary ejector pin for pressing said molded product and separating the molded product from said core after the movable side die is separated by said predetermined distance from the fixed side die.

3. A die for injection molding as claimed in claim 1, wherein said separating delay means has a resilient body for pressing said molded product by said core and holding the molded product in said cavity block until said movable side die is separated by the predetermined distance from said fixed side die, and also has a stopper for limiting resilient force of said resilient body and releasing pressing force of the core after the movable side die is separated by said predetermined distance from the fixed side die.

4. A die for injection molding as claimed in claim 1 or 3, wherein said fixed side die has pressure adjusting means capable of adjusting pressing force of said core by providing resilient force acting against resilient force of said resilient body of said separating delay means.

5. A die for injection molding as claimed in claim 4, wherein said pressure adjusting means has a resilient body adjustable in resilient force and resiliently supported in said fixed side die and also has a balance pin biased on a side of said movable side die by said resilient body and coming in contact with a guide pin integrated with said core.

* * * * *